United States Patent
Belpaire et al.

(10) Patent No.: US 10,933,922 B2
(45) Date of Patent: Mar. 2, 2021

(54) DEVICE FOR REINFORCING AND SEALING A STRUCTURAL ELEMENT

(71) Applicant: SIKA TECHNOLOGY AG, Baar (CH)

(72) Inventors: Vincent Belpaire, Uccle (BE); Ardi Shehu, Rotselaar (BE)

(73) Assignee: SIKA TECHNOLOGY AG, Baar (CH)

( * ) Notice: Subject to any disclaimer, the term of this patent is extended or adjusted under 35 U.S.C. 154(b) by 107 days.

(21) Appl. No.: 16/192,372

(22) Filed: Nov. 15, 2018

(65) Prior Publication Data

US 2019/0144049 A1 May 16, 2019

(30) Foreign Application Priority Data

Nov. 15, 2017 (EP) .................................. 17201952

(51) Int. Cl.
*B60J 7/00* (2006.01)
*B62D 29/00* (2006.01)
*B62D 25/04* (2006.01)
*B62D 25/00* (2006.01)

(52) U.S. Cl.
CPC .......... *B62D 29/002* (2013.01); *B62D 25/00* (2013.01); *B62D 25/04* (2013.01); *B62D 29/005* (2013.01)

(58) Field of Classification Search
CPC . H01L 2924/00014; H01L 2224/32225; H01L 2924/00; H01L 2924/00013; H01L 2924/12042; B29C 66/71; C04B 38/08; C04B 41/009; C08F 36/04
See application file for complete search history.

(56) References Cited

U.S. PATENT DOCUMENTS

| | | | | |
|---|---|---|---|---|
| 6,058,673 A | * | 5/2000 | Wycech | E04C 3/29 52/834 |
| 6,068,424 A | * | 5/2000 | Wycech | B62D 27/026 403/269 |
| 6,168,226 B1 | * | 1/2001 | Wycech | B62D 29/007 296/146.6 |
| 6,341,467 B1 | * | 1/2002 | Wycech | B29C 44/18 296/193.06 |
| 6,358,584 B1 | * | 3/2002 | Czaplicki | B62D 29/002 138/106 |

(Continued)

FOREIGN PATENT DOCUMENTS

EP 1930231 A1 6/2008
WO 01/58741 A1 8/2001

OTHER PUBLICATIONS

Jun. 26, 2018 Extended European Search Report issued in European Patent Application No. 17201952.3.

*Primary Examiner* — Kiran B Patel
(74) *Attorney, Agent, or Firm* — Oliff PLC

(57) ABSTRACT

A device for reinforcing and sealing a structural element in a motor vehicle including a reinforcing element which has a longitudinal axis and which is disposable in a cavity of the structural element, wherein the reinforcing element includes walls which extend substantially in the direction of the longitudinal axis, wherein part-regions of the walls on an external circumference of the reinforcing element form at least one strip which encircles the reinforcing element and which runs transversely to the longitudinal axis of the reinforcing element.

13 Claims, 3 Drawing Sheets

(56) References Cited

U.S. PATENT DOCUMENTS

| | | | | |
|---|---|---|---|---|
| 6,474,726 B1* | 11/2002 | Hanakawa | ............ | B62D 25/04 296/187.12 |
| 6,494,525 B1* | 12/2002 | Blank | ................ | B62D 21/157 264/46.6 |
| 7,063,376 B2* | 6/2006 | Ori | ........................ | B62D 25/08 296/187.01 |
| 7,226,120 B2* | 6/2007 | Yamazaki | ............... | F16F 7/015 188/371 |
| 7,497,504 B2* | 3/2009 | Peters | ................... | B60J 5/0444 296/146.6 |
| 7,735,906 B2* | 6/2010 | Takahashi | ............ | B62D 29/002 296/187.02 |
| 8,256,829 B2* | 9/2012 | Browne | ................ | B62D 21/15 296/187.02 |
| 9,150,001 B2* | 10/2015 | Richardson | ......... | B29C 65/4855 |
| 9,162,707 B2* | 10/2015 | Eipper | .................. | B62D 25/04 |
| 10,173,727 B2* | 1/2019 | Li | ........................ | B62D 21/15 |
| 10,308,201 B2* | 6/2019 | Newcomb | .............. | B60R 19/34 |
| 10,308,286 B2* | 6/2019 | Yang | ................... | B62D 29/005 |
| 2002/0125739 A1* | 9/2002 | Czaplicki | ............. | B62D 29/002 296/187.02 |
| 2003/0090129 A1* | 5/2003 | Riley | ................... | B62D 21/152 296/203.03 |
| 2003/0137162 A1* | 7/2003 | Kropfeld | ............ | B62D 29/002 296/203.01 |
| 2003/0151273 A1* | 8/2003 | Sakamoto | ................ | B21C 1/22 296/187.01 |
| 2003/0184121 A1* | 10/2003 | Czaplicki | ................ | B29C 44/18 296/187.02 |
| 2003/0201572 A1* | 10/2003 | Coon | .................... | B29C 44/184 264/263 |
| 2004/0046421 A1* | 3/2004 | Barz | .................... | B62D 29/002 296/187.02 |
| 2004/0221953 A1* | 11/2004 | Czaplicki | ............. | B62D 29/002 156/293 |
| 2006/0008615 A1* | 1/2006 | Muteau | ................. | B29C 44/385 428/116 |
| 2008/0029200 A1* | 2/2008 | Sheasley | ................. | B60R 13/06 156/79 |
| 2008/0296164 A1* | 12/2008 | Dajek | .................. | B62D 29/002 205/80 |
| 2011/0049323 A1* | 3/2011 | Belpaire | ............... | B62D 29/002 248/351 |
| 2011/0057481 A1* | 3/2011 | Belpaire | ............... | B62D 29/002 296/193.01 |
| 2011/0206890 A1* | 8/2011 | Belpaire | ............... | B62D 29/005 428/68 |
| 2011/0298244 A1* | 12/2011 | Ballesteros | ......... | B29C 45/1418 296/193.05 |
| 2012/0043019 A1* | 2/2012 | Belpaire | ............... | B29C 44/1228 156/293 |
| 2012/0141724 A1* | 6/2012 | Belpaire | ............... | B62D 29/002 428/99 |
| 2012/0146296 A1* | 6/2012 | Deachin | ................ | B29C 44/188 277/637 |
| 2012/0280534 A1* | 11/2012 | Eipper | .................. | B62D 21/09 296/187.01 |
| 2013/0133771 A1* | 5/2013 | Richardson | ............... | F16L 9/00 138/109 |
| 2013/0186562 A1* | 7/2013 | Finter | ................. | C08G 59/4246 156/293 |
| 2013/0209197 A1* | 8/2013 | Quaderer | ............... | F16B 19/004 411/510 |
| 2014/0203592 A1* | 7/2014 | Nagwanshi | .......... | B62D 29/004 296/187.01 |
| 2016/0229456 A1* | 8/2016 | Boettcher | ............ | B62D 25/025 |
| 2018/0022397 A1* | 1/2018 | Richardson | ............. | B29C 69/02 296/187.03 |
| 2018/0304932 A1* | 10/2018 | Cooper | ................. | B62D 25/025 |
| 2019/0002029 A1* | 1/2019 | Niggemann | ........... | B62D 25/02 |
| 2019/0144041 A1* | 5/2019 | Belpaire | ............... | B62D 27/026 296/209 |
| 2019/0144047 A1* | 5/2019 | Belpaire | ............... | B62D 25/025 296/202 |
| 2019/0144050 A1* | 5/2019 | Belpaire | ................. | B62D 25/00 296/187.01 |
| 2019/0382056 A1* | 12/2019 | Shantz | ................. | B62D 29/004 |

* cited by examiner

DEVICE FOR REINFORCING AND SEALING A STRUCTURAL ELEMENT

The present invention relates to a device for reinforcing and sealing a structural element, as well as to a system of a reinforced and sealed structural element of a motor vehicle.

Construction elements such as, for example, bodies and/or chassis frames of transportation and conveyance means, in particular of aquatic or terrestrial vehicles or of aircraft, in many instances have structures having cavities in order for lightweight constructions to be enabled. These cavities however cause the most varied of problems. Depending on the type of the cavity, the latter has to be sealed in order to prevent the ingress of moisture and contaminations which can lead to corrosion of the construction elements. It is often also desirable for the cavities and thus the construction element to be substantially reinforced but for the low weight to be maintained. It is often also necessary for the cavities and thus the construction elements to be stabilized in order for noises which would otherwise be transmitted along the cavity or through the latter to be reduced. Many of these cavities have an irregular shape or tight dimensions, on account of which it becomes difficult to properly seal, reinforce, and insulate said cavities.

Sealing elements (baffles) are therefore used in particular in the automotive industry but also in the aviation and nautical industry in order for cavities to be sealed and/or to be acoustically closed off, or reinforcing elements (reinforcers) are used in order for cavities to be reinforced.

A body of an automobile is schematically illustrated in FIG. 1a. The body 10 herein has various structures having cavities such as, for example, pillars 14 and supports or stays 12, respectively. Such structural elements 12, 14 having cavities are usually sealed or reinforced, respectively, using sealing and/or reinforcing elements 16.

A cross section through a structural element 12, 14 is schematically illustrated in FIG. 1b. It is often the case in such structural elements 12, 14, that a first panel sheet 4 and a second panel sheet 5 are joined together at joints 6, 7, wherein the panel sheets 4, 5 configure a cavity 3 between the joints 6, 7.

It is furthermore desirable for such structural elements 12, 14 to be sealed and reinforced by way of weight-optimized and efficient components.

It is therefore an object of the present invention to make available improvements to a system of a reinforced and sealed structural element, wherein components that are as efficient and weight-optimized as possible are to be used.

This object is achieved by a device for reinforcing and sealing a structural element in a motor vehicle, said device comprising a reinforcing element which has a longitudinal axis and which is disposable in a cavity of the structural element, wherein the reinforcing element comprises walls which extend substantially in the direction of the longitudinal axis, wherein part-regions of the walls on an external circumference of the reinforcing element form at least one strip which encircles the reinforcing element and which runs transversely to the longitudinal axis of the reinforcing element.

This solution offers the advantage that, on account of the provision of such a strip, the reinforcing element can additionally be utilized for sealing the structural element. This has not been possible to the same degree by way of conventional reinforcing elements because the reinforcing elements known to date have a chequerboard-type surface for linking to the structural element such that a continuous and completely sealing ring of adhesive could not be attached to the reinforcing element.

It is a core concept of the present invention that features can be additionally disposed on a reinforcing element in order for the reinforcing element to also fulfil a sealing function. Two functions, specifically the reinforcing and the sealing of structural elements having cavities, can thus be taken care of by a single element by way of a suitable design embodiment of the surface of the reinforcing element, this entailing advantages in terms of both weight and costs. Moreover, such a combined element is simpler and more cost-effective in terms of application since only one element has to be ordered, warehoused, prepared and installed.

The device proposed here furthermore has the advantage that only one element can be used in structural elements having tight space conditions in order for the structural element to be both sealed as well as reinforced.

In one exemplary embodiment the strip completely encircles the reinforcing element such that a closed continuous strip is present.

In one alternative embodiment the strip encircles the reinforcing element in a substantially complete manner such that a substantially continuous strip is present.

In one further alternative embodiment the strip does not completely encircle the reinforcing element, wherein the strip in the circumferential direction is interrupted by a gap.

In one exemplary refinement said gap in the circumferential direction is at most 10 mm, or at most 8 mm, or at most 6 mm, or at most 4 mm, or at most 2 mm.

In one exemplary embodiment the reinforcing element measured in the direction of the longitudinal axis of the reinforcing element has an extent of at least 50 mm.

This offers the advantage that the device, as opposed to conventional sealing elements, can also be used for reinforcing structural elements.

In one exemplary embodiment the strip measured in the direction of the longitudinal axis of the reinforcing element has an extent of at least 3 mm, or at least 5 mm, or at least 7 mm, or at least 9 mm, or at least 11 mm, or at least 13 mm, and/or of at most 30 mm, or at most 25 mm, or at most 20 mm, or at most 15 mm.

This offers the advantage that a sealing function can be guaranteed by way of a suitable dimensioning of the strip, and that the device is simultaneously designed so as not to be unnecessarily heavy and large.

In one exemplary embodiment a plane that is disposed so as to be orthogonal to the longitudinal axis of the reinforcing element can be placed such that a section line of said plane by way of the external circumference of the reinforcing element lies completely in the strip.

This offers the advantage that a sealing of the structural element that is as efficient as possible can be achieved on account thereof, because a weight of a sealing compound can be optimized by way of such an arrangement.

In one exemplary embodiment the reinforcing element beside the strip has faces for the adhesive bonding to the structural element.

In one exemplary embodiment the reinforcing element in the direction of the longitudinal axis ahead of and behind the strip has in each case faces for the adhesive bonding to the structural element.

This offers the advantage that the reinforcing function of the device can be optimized on account thereof, because an improved reinforcing effect is achievable by way of an as widely as possible distributed adhesive bonding of the reinforcing element to the structural element.

In one exemplary embodiment a first adhesive is disposed at least on part-regions of the walls beside the strip, and wherein a second adhesive is disposed at least on part-regions of the strip.

This offers the advantage that both functions of the device, specifically the sealing and the reinforcing of the structural element, can be optimized on account of the provision of two different adhesives.

In one exemplary embodiment the reinforcing element comprises ribs which interconnect the walls.

This offers the advantage that a reinforcing element which per se is capable of bearing a higher mechanical load can be achieved on account thereof.

In one exemplary embodiment the reinforcing element contains metal, steel, aluminium, magnesium, plastics material, fibre-reinforced plastics material, organic sheet material, or a combination of said materials.

In one exemplary embodiment the walls are formed from the same material.

The reinforcing element described here can be produced by a three-dimensional printing method, for example.

The object set at the outset is moreover achieved by a system of a reinforced and sealed structural element in a motor vehicle, the system comprising: a structural element; a reinforcing element according to the above description, wherein the reinforcing element is disposed in the structural element; and a first adhesive, wherein the first adhesive interconnects the reinforcing element and the structural element; and a second adhesive, wherein the second adhesive connects the strip to the structural element.

In one exemplary embodiment the first adhesive has an expansion rate of less than 500%, or less than 400%, or less than 300%, or the adhesive is a non-expandable adhesive.

Materials which are expandable to a lesser degree, or non-expandable materials, offer the advantage that the adhesive, on account thereof, does not lose mechanical stability to an excessive degree on expansion. In principle, a material becomes weaker in mechanical terms the more the material is expanded.

SikaReinforcer®-940 or SikaPower®-497 are examples of adhesives which are non-expandable or expandable to a lesser degree. SikaReinforcer®-940 herein is an example of an expandable material, whereas SikaPower®-497 is an example of a non-expandable material.

The term "non-expandable" in the context of this invention means that a material varies the volume thereof by not more than or less than 10% in the process steps envisaged for said material. For example, non-expandable adhesives can shrink to a minor degree when curing. Such a volumetric variation when curing is considered to be "non-expandable" in the context of this application.

In one exemplary embodiment the second adhesive is an expandable adhesive.

In one exemplary embodiment the second adhesive has an expansion rate of more than 800%, preferably of more than 1000%, particularly preferably of more than 1500%.

An example of such comparatively heavily expandable adhesives is in particular SikaBaffle®-450.

In one exemplary embodiment the first adhesive and/or the second adhesive are/is capable of being cured by a temperature of more than 120°, or of more than 140°, or of more than 160°.

In one exemplary embodiment upon curing of the adhesives the first adhesive has an E-modulus of at least 100 MPa or of at least 150 MPa or of at least 200 MPA, and the second adhesive has an E-modulus of at most 20 MPa or at most 15 MPa or at most 10 MPa.

In one further alternative embodiment the system comprises a third adhesive, wherein the adhesives have dissimilar properties, in particular in terms of expansion and/or curing and/or a mating capability and/or a mechanical load-bearing capacity.

Details and advantages of the invention will be described hereunder by means of exemplary embodiments and with reference to schematic drawings.

Figure 1A:
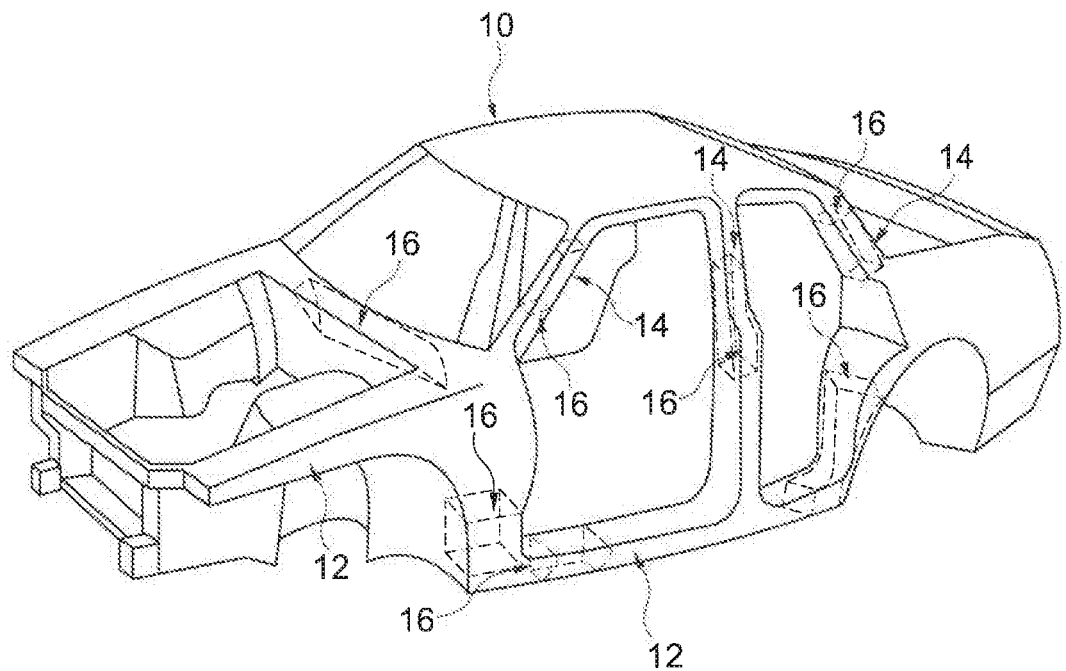
FIG. 1a shows a schematic illustration of a body.
Figure 1B:
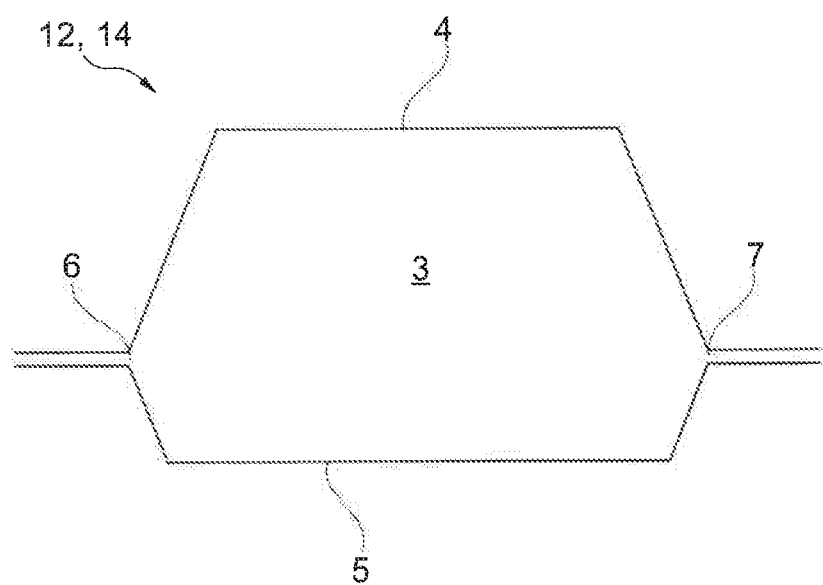
FIG. 1b shows a schematic illustration of a cross section through a structural element.
Figure 2A:
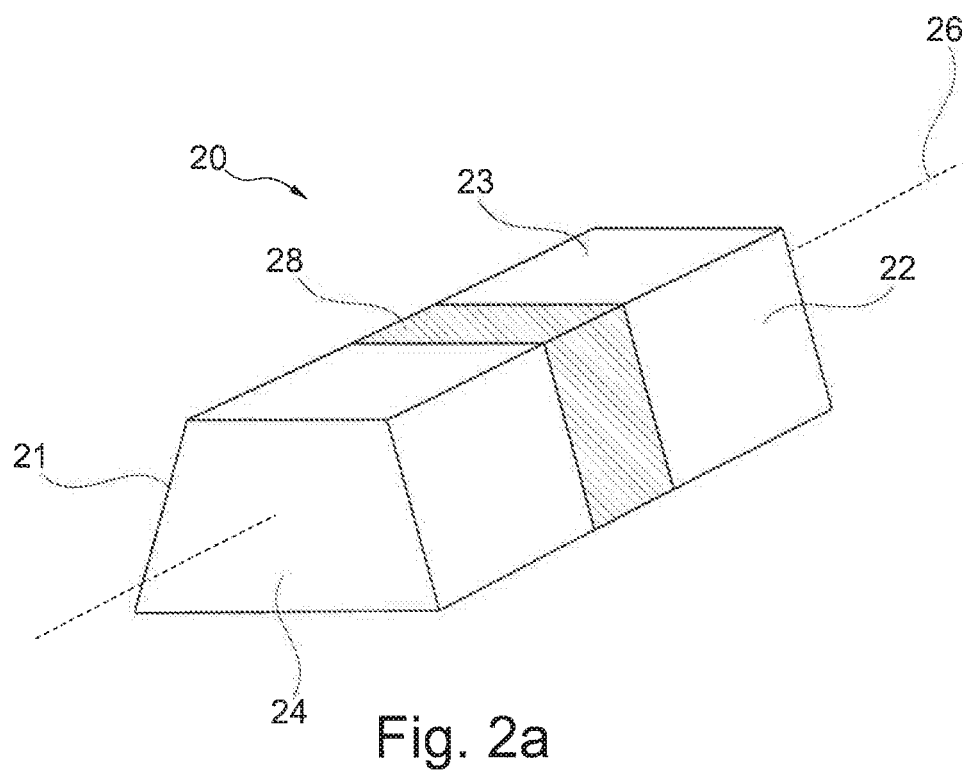
FIGS. 2a to 4 show a schematic illustration of a device for reinforcing and sealing a structural element.
Figure 2B:
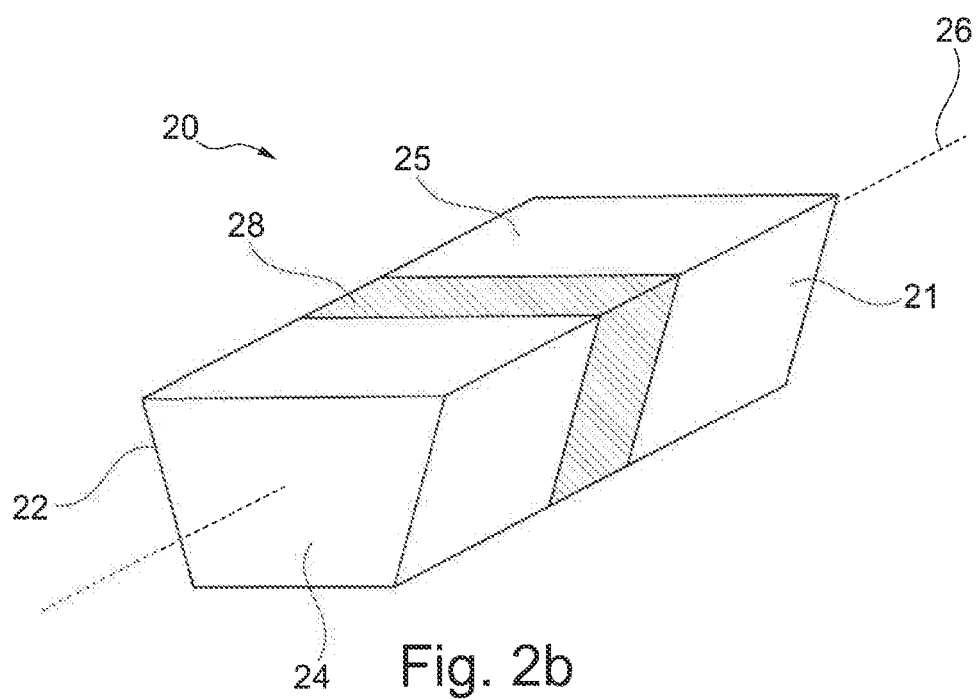

A first exemplary embodiment of a reinforcing element 20 is schematically shown in FIGS. 2a and 2b. The reinforcing element 20 has a longitudinal axis 26 and side walls 21, 22, 23, 25 which extend along said longitudinal axis 26. The reinforcing element 20 in this exemplary embodiment moreover has a front wall 24 and a rear wall 24.

Part-regions of the side walls 21, 22, 23, 25 form a strip 28 which encircles the reinforcing element 20 and which runs transversely to the longitudinal axis 26.

The side walls 21, 22, 23, 25 beside the strip 28 have further part-regions for connecting the reinforcing element 20 to the structural element. Said further part-regions in the direction of the longitudinal axis 26 are disposed both in front of as well as behind the strip 28.

A more heavily expandable adhesive can be disposed on the strip 28 in order for the cross section of the structural element to be completely sealed. A less heavily expandable or a non-expandable adhesive can be disposed on the connecting faces beside the strip 28 in order for the reinforcing element 20 to be adhesively bonded to the structural element and for the latter to be mechanically reinforced.

Figure 3:
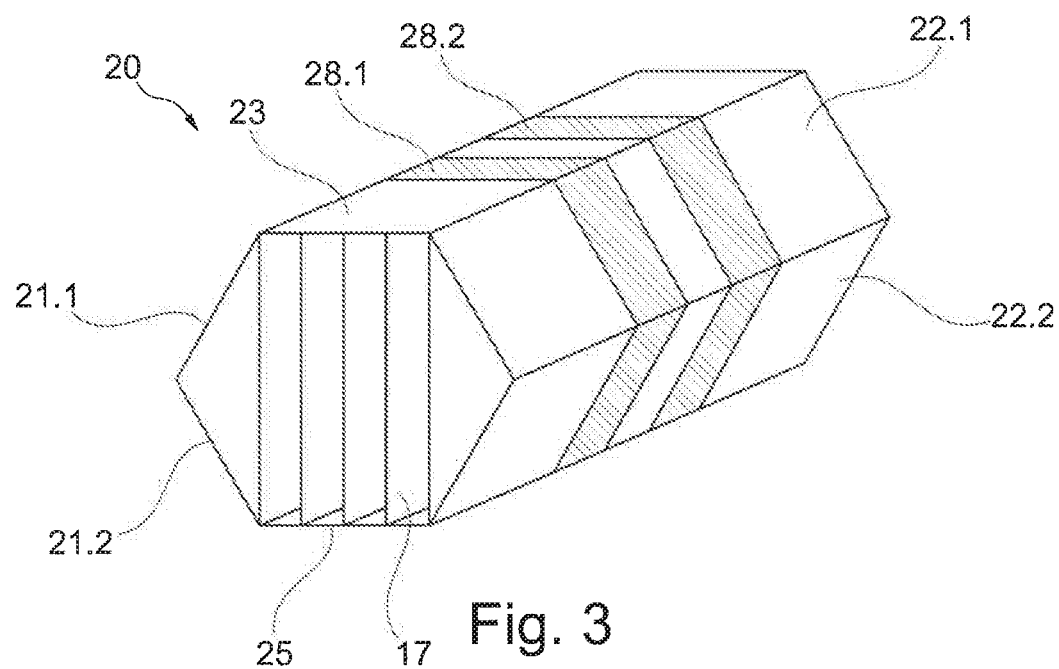

One further exemplary embodiment of a reinforcing element 20 is schematically illustrated in FIG. 3. By contrast to the reinforcing element 20 in FIGS. 2a and 2b, this reinforcing element 20 has side walls 21, 22 which are in each case subdivided into part-walls 21.1, 21.2, 22.1, 22.2, a first strip 28.1 and a second strip 28.2, as well as ribs 17 in an interior of the reinforcing element 20. This reinforcing element 20 moreover does not have any front wall 24 or any rear wall 24.

The provision of a plurality of strips 28.1, 28.2 can be utilized for sealing the structural element at different locations, or for improving any sealing of the structural element.

Figure 4:
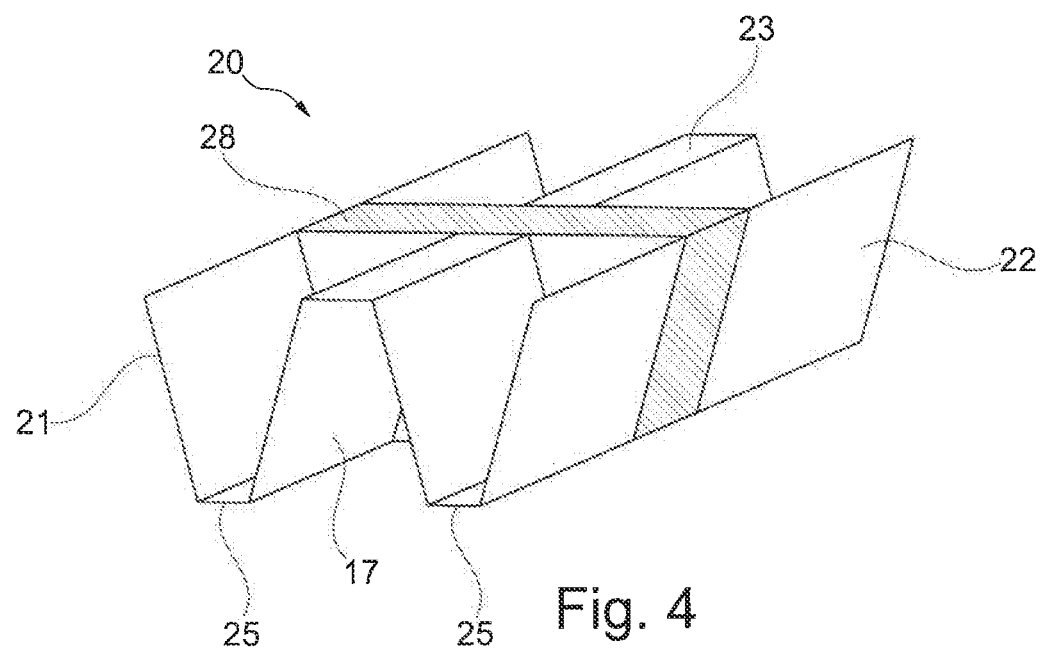

One further exemplary embodiment of a reinforcing element 20 is schematically illustrated in FIG. 4. By contrast to the examples in FIGS. 2a and 2b as well as 3, this reinforcing element 20 does not have any closed side walls 21, 22, 23, 25 but has a W-shaped or M-shaped cross section, respectively, such that the third side wall 23 and the fourth side wall 25 do not completely cover the respective sides.

The strip 28 in this exemplary embodiment is again formed by the side walls 21, 22, 23, 25 which at the location of the strip 28 are in each case configured so as to be continuous.

LIST OF REFERENCE SIGNS

1 System
3 Cavity
4 First panel sheet
5 Second panel sheet
6 First joint
7 Second joint 10 Body
11 Reinforcing element
12 Structural element
13 Adhesive
14 Structural element
16 Device
17 Rib
20 Reinforcing element
21 First side wall
22 Second side wall
23 Third side wall
24 Front/rear wall
25 Fourth side wall
26 Longitudinal axis
28 Strip

The invention claimed is:

1. A device for reinforcing and sealing a structural element in a motor vehicle, said device comprising:
a first adhesive having an expansion rate of less than 500%,
a second adhesive having an expansion rate of more than 800%, and
a reinforcing element which has a longitudinal axis and which is configured to be disposed in a cavity of the structural element,
wherein:
the reinforcing element comprises walls which extend substantially in the direction of the longitudinal axis;
part-regions of the walls on an external circumference of the reinforcing element form at least one strip which encircles the reinforcing element and which runs transversely to the longitudinal axis of the reinforcing element,
the first adhesive is disposed at least on part-regions of the walls beside the at least one strip, and
the second adhesive is disposed at least on part-regions of the at least one strip.

2. The device according to claim 1, wherein the reinforcing element measured in the direction of the longitudinal axis of the reinforcing element has an extent of at least 50 mm.

3. The device according to claim 1, wherein the at least one strip measured in the direction of the longitudinal axis of the reinforcing element has an extent of at least 3 mm and/or of at most 30 mm.

4. The device according to claim 1, wherein a plane that is disposed so as to be orthogonal to the longitudinal axis of the reinforcing element can be placed such that a section line of said plane by way of the external circumference of the reinforcing element lies completely in the at least one strip.

5. The device according to claim 1, wherein the reinforcing element beside the at least one strip has faces configured for adhesive bonding to the structural element, and/or wherein the reinforcing element in the direction of the longitudinal axis ahead of and behind the at least one strip has in each case faces configured for adhesive bonding to the structural element.

6. The device according to claim 1, wherein the reinforcing element further comprises ribs which interconnect the walls.

7. The device according to claim 1, wherein the walls are formed from the same material.

8. The device according to claim 1, wherein the reinforcing element contains metal, steel, aluminium, magnesium, plastics material, fibre-reinforced plastics material, organic sheet material, or a combination of said materials.

9. A system of a reinforced and sealed structural element in a motor vehicle, the system comprising:
a structural element;
a reinforcing element which has a longitudinal axis, wherein: (a) the reinforcing element comprises walls which extend substantially in the direction of the longitudinal axis; (b) part-regions of the walls on an external circumference of the reinforcing element form at least one strip which encircles the reinforcing element and which runs transversely to the longitudinal axis of the reinforcing element; and (c) the reinforcing element is disposed in the structural element;
a first adhesive having an expansion rate of less than 500%, wherein the first adhesive interconnects the reinforcing element and the structural element; and
a second adhesive having an expansion rate of more than 800%, wherein the second adhesive connects the at least one strip to the structural element.

10. The system according to claim 9, wherein the first adhesive is a non-expandable adhesive.

11. The system according to claim 9, wherein upon curing of the adhesives the first adhesive has an E-modulus of at least 100 MPa, and the second adhesive has an E-modulus of at most 20 MPa.

12. The device according to claim 1, wherein the first adhesive is a non-expandable adhesive.

13. The system according to claim 9, wherein the first adhesive is disposed at least on part-regions of the walls beside the at least one strip, and the second adhesive is disposed at least on part-regions of the at least one strip.

* * * * *